United States Patent [19]

Hart et al.

[11] Patent Number: 5,302,934
[45] Date of Patent: Apr. 12, 1994

[54] TEMPERATURE SENSOR

[75] Inventors: John R. Hart, Lexington; Lowell F. Kline, Mansfield, both of Ohio

[73] Assignee: Therm-O-Disc, Incorporated, Mansfield, Ohio

[21] Appl. No.: 41,856

[22] Filed: Apr. 2, 1993

[51] Int. Cl.$^5$ .......................... H01C 7/10; H01C 3/04
[52] U.S. Cl. ............................ 338/22 R; 338/22 SD; 338/25; 338/28; 338/30
[58] Field of Search .................. 338/22 R, 22 SD, 25, 338/27, 28, 30

[56] References Cited

U.S. PATENT DOCUMENTS

| | | | |
|---|---|---|---|
| 4,959,633 | 9/1990 | Kiraly et al. | 338/22 R |
| 5,046,857 | 9/1991 | Metzger et al. | 338/22 R X |

Primary Examiner—Marvin M. Lateef
Attorney, Agent, or Firm—Jones, Day, Reavis & Pogue

[57] ABSTRACT

A thermistor positioned within a tubular probe adjacent its closed distal end has lead wires connected with terminals by both crimp and weld connections that are independent of one another. A non-rigid heat transfer medium fills the distal end portion of the probe in surrounding relationship to the thermistor. An opening in the sensor housing leads to the interior of the probe and receives a dielectric sleeve in which tail end portions of the terminals are positioned.

12 Claims, 4 Drawing Sheets

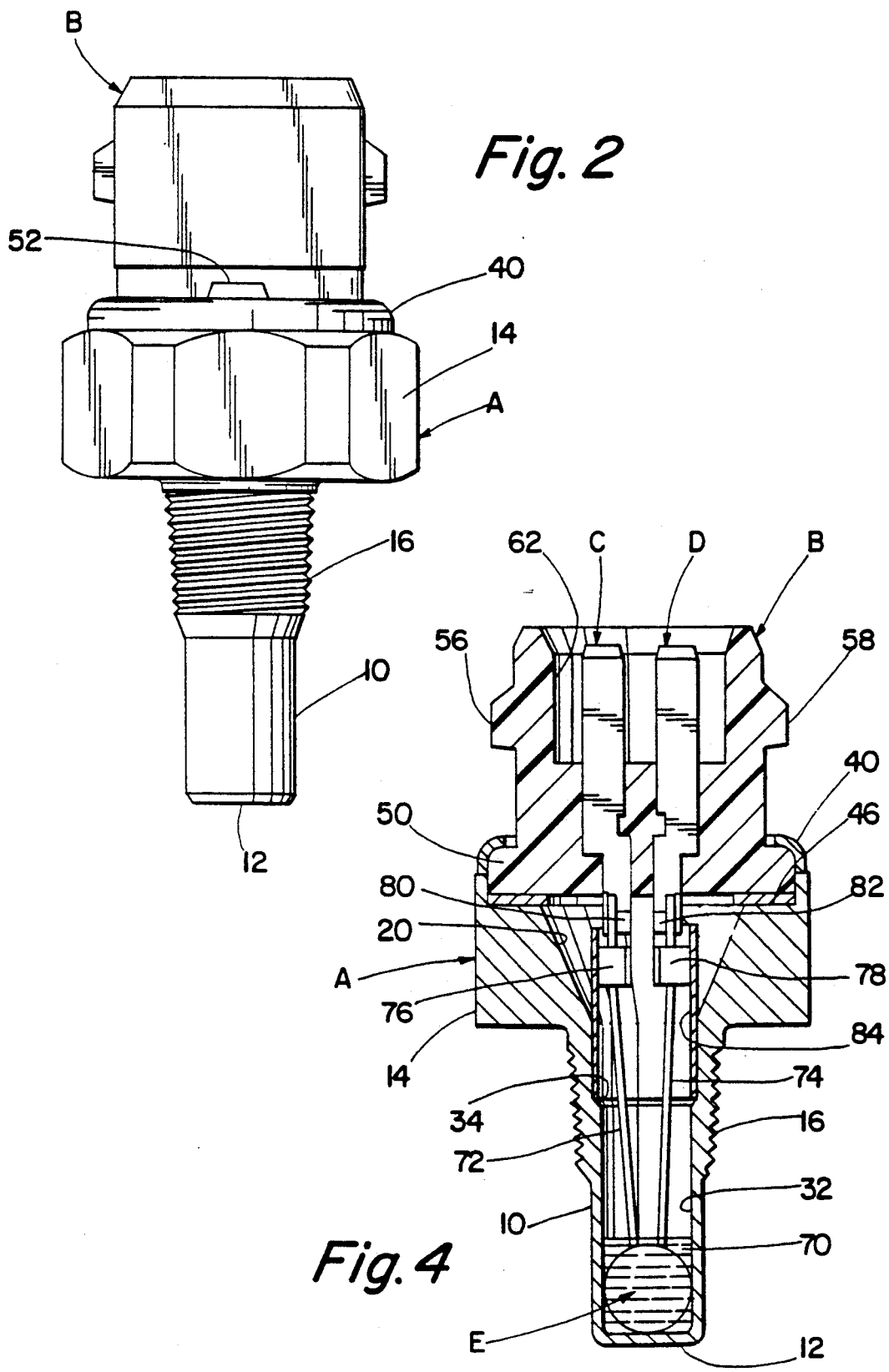

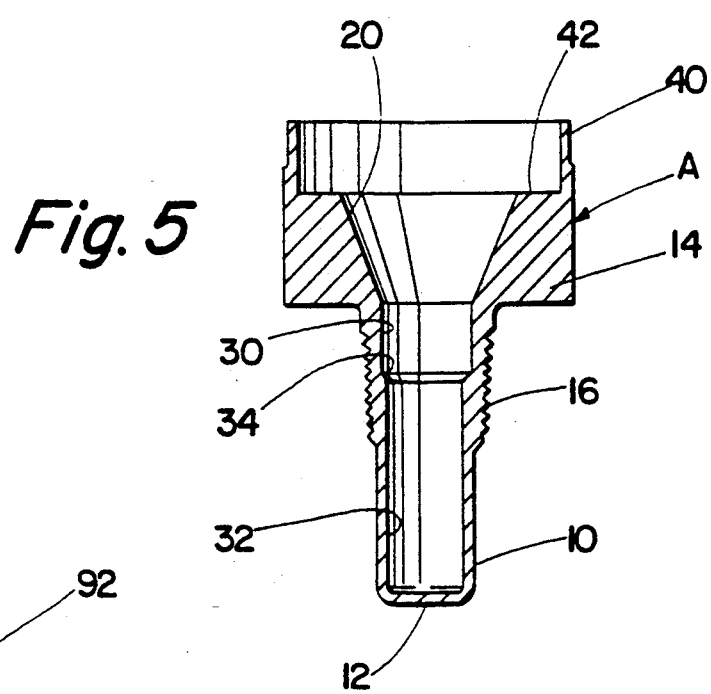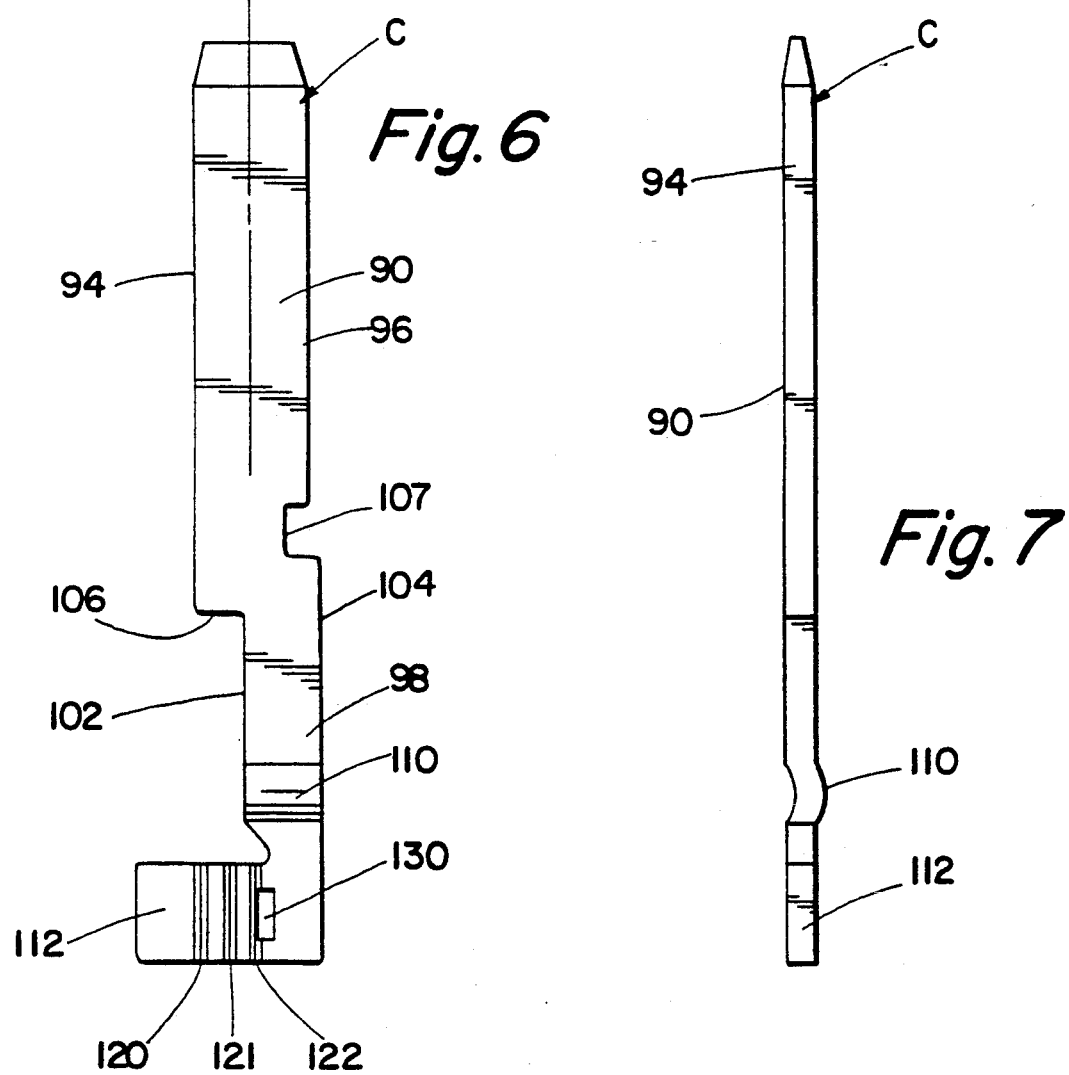

TEMPERATURE SENSOR

BACKGROUND OF THE INVENTION

This application relates to the art of sensors and, more particularly, to sensors of the type having a thermistor positioned within a tubular probe. The invention is particularly applicable to temperature sensors for sensing the temperature of a fluid and will be described with specific reference thereto. However, it will be appreciated that the invention has broader aspects and can be used for other purposes such as sensing liquid levels by supplying sufficient current to the thermistor to cause self-heating.

Temperature sensors commonly include a thermistor positioned within a tubular probe. It is common to pot the thermistor in a rigid heat transfer medium such as epoxy. Damage to the thermistor, and to the lead wires and their connections to plug-in terminals, may occur due to thermal expansion and contraction during use of the device or by curing of the potting medium. It would be desirable to improve the integrity of the connections between the lead wires and the terminals, and to minimize damage or failure caused by expansion and contraction during use of the device.

SUMMARY OF THE INVENTION

A temperature sensor of the type described has the thermistor lead wires connected to the terminals with both crimp connections and weld connections. This redundant connection arrangement between the thermistor lead wires and the terminals provides very high reliability of the temperature sensor.

In a preferred arrangement, the crimp connection is located closer to the thermistor than the weld connection.

In accordance with another aspect of the application, a non-rigid heat transfer medium such as silicon grease completely fills the distal end portion of the probe in surrounding and encapsulating relationship to the thermistor.

The terminals are shaped with grooves and embossed depressions for enhancing the crimp connection to the lead wires. The terminals are also shaped to minimize leakage of air or liquid therepast, and to securely lock same in a molded plastic connector.

An opening in the sensor housing communicates with the interior of the tubular probe. The opening is enlarged and receives a dielectric sleeve in which the lead wire-to-terminal connections are positioned.

The cylindrical bore in the probe has two different diameters intersecting at a shoulder and the dielectric sleeve has one end abutting the shoulder.

It is principal object of the present invention to provide an improved sensor having redundant connections between terminals and lead wires.

It is also an object of the invention to provide a sensor having improved terminals.

It is another object of the invention to provide a sensor with a non-rigid heat transfer medium surrounding the thermistor.

BRIEF DESCRIPTION OF THE DRAWING

FIG. 2 is a side elevational view similar to FIG. 1 and showing the opposite side of the temperature sensor;

FIG. 4 is a cross-sectional elevational view taken generally on line 4—4 of FIG. 3;

FIG. 5 is a cross-sectional elevational view of the metal housing portion of the temperature sensor in FIGS. 1-4;

FIG. 6 is a plan view of a terminal;

FIG. 7 is a side elevational view of the terminal of FIG. 6.

DESCRIPTION OF A PREFERRED EMBODIMENT

Figure 1:
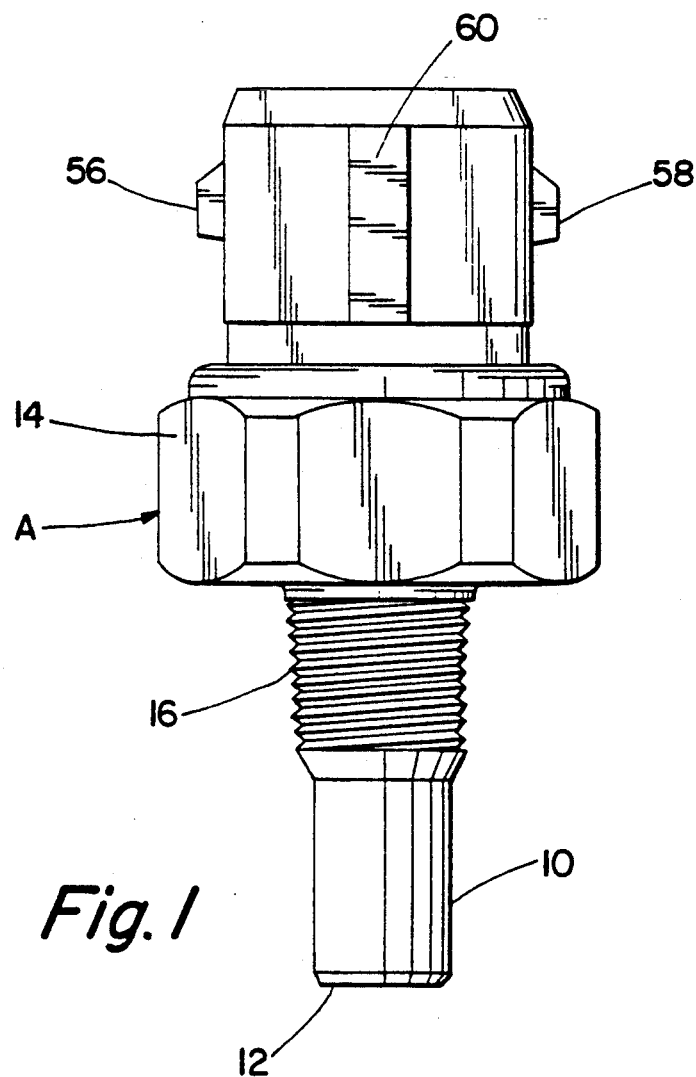
FIG. 1 is a side elevational view showing one side of a temperature sensor constructed in accordance with the present application.
Figure 3:
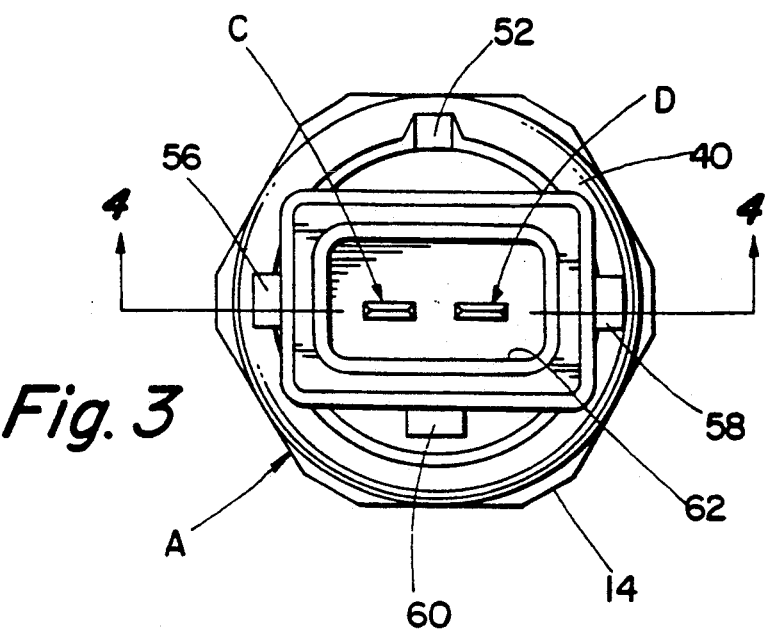
FIG. 3 is a top plan view thereof.

Referring now to the drawing, wherein the showings are for purposes of illustrating a preferred embodiment of the invention only and not for purposes of limiting same, the figures show a metal housing A assembled to a plastic connector B.

Housing A includes an elongated tubular probe 10 having a closed distal end 12 and an enlarged head 14 that is externally shaped for cooperation with a tool to facilitate installation and removal of the sensor. Tubular probe 10 has external threads 16 thereon beneath enlarged head portion 14 along about one-half of the length of the probe for reception in a tapped hole. When installed, the unthreaded portion of tubular probe 10 and its closed distal end 12 are immersed in the fluid whose temperature is to be sensed.

Housing A has an enlarged entrance opening 20 in enlarged head portion 14 opposite from closed distal end 12 for providing access to the hollow interior of probe 10. Opening 20 is of generally inverted frustolconical shape to facilitate insertion of components into the probe.

Referring to FIG. 5, the interior of tubular probe 10 has first and second different diameter cylindrical portions 30, 32 that intersect at a shoulder 34. The first and larger diameter cylindrical portion 30 has a length substantially less than the second smaller diameter cylindrical portion 32. Preferably, the smaller diameter portion is at least about three times the length of the larger diameter portion. A thin deformable attaching ring 40 extends upwardly from the flat upper end 42 of enlarged head portion 14.

Referring to FIG. 4, an elastomeric gasket 46 is positioned on flat upper end 42 of housing enlarged head portion 14. A flat end of connector B is positioned against gasket 46 and pressure is applied thereto for compressing the gasket. Deformable housing ring 40 is then deformed inwardly over a circular flange 50 on connector B to seal opening 20 and the interior of probe 10. A locking projection 52 on connector B adjacent flange 50 thereof interlocks with inwardly deformed ring 40 on housing A to prevent relative rotation between connector B and housing A.

Connector B has opposite side projections 56, 58 for cooperation with latches on a socket in a known manner. Connector B also has a longitudinal projection 60 for properly orienting connector B with a socket and guiding same into the socket. Connector B has a cavity 62 surrounding portions of terminals C, D that are molded into connector B. The portions of terminals C, D within cavity 62 are receivable in sockets in a known manner.

A thermistor E having a negative temperature coefficient of electrical resistance is positioned within tubular probe 10 adjacent closed distal end 12 thereof. The inner end portion of probe 10 adjacent distal end 12 thereof is completely filled with a non-rigid heat transfer medium 70 such as silicon grease. The amount of heat transfer medium 70 is preferably just sufficient to insure complete encapsulation of thermistor E therein so that the major length of the interior of probe 10 remains free of heat transfer medium to minimize transfer of heat toward enlarged head 14. The wall thickness of the unthreaded portion of probe 10 and distal end 12 is preferably not greater than about 0.032 inch to insure rapid transfer of heat to thermistor E.

Lead wires attached to thermistor E are connected with tail end portions of terminals C, D by both crimp connections 76, 78 and weld connections 80, 82. The crimp and weld connections are longitudinally spaced-apart from one another along the longitudinal axes of terminals C, D. Crimp connections 76, 78 are located closer to thermistor E than weld connections 80, 82. A dielectric sleeve 84 is received in enlarged opening 20 and closely received within the first larger diameter inner cylindrical portion of the probe. The bottom end of dielectric sleeve 78 abuts shoulder 34 formed by the intersection of the first and second large and smaller inner cylindrical portions of the probe.

FIGS. 6 and 7 show terminal C having a flat blade portion 90 with a longitudinal axis 92 and parallel opposite sides 94, 96. Blade portion 90 intersects a flat tail portion 98 having a reduced width and being laterally offset relative to longitudinal axis 92. Opposite sides 102, 104 of tail portion 98 are laterally offset from sides 94, 96 of blade portion 90. The shoulder 106 formed by the intersection of blade side 94 with tail side 102 provides a tortuous path to inhibit leakage of fluid along the terminal. A rectangular notch 107 in side 96 of blade 90 adjacent tail portion 104 serves the same purpose. These irregularities in the sides of the terminal also enhance interlocking of the terminals with the molded plastic connector.

Figure 8:
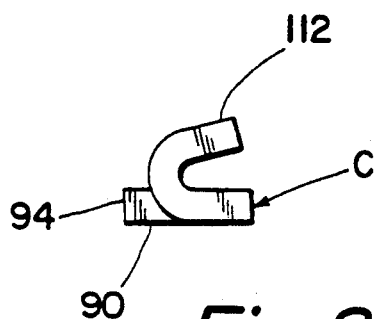
FIG. 8 is an end elevational view showing the bottom crimp connecting portion of the terminal subsequent to forming thereof into a generally U-shaped configuration.

Tail portion 98 is formed with a curved transversely extending embossment 110 on which a wire lead is positioned to form a weld connection. A crimp connection portion 112 is shown in its flat configuration in FIG. 6 prior to lateral bending of same into a generally U-shaped configuration. A plurality of spaced-apart longitudinal generally V-shaped grooves 120-122 are formed on the surface of crimp connection portion 112 to facilitate bending of same into a generally U-shaped configuration and to enhance flattening of the generally U-shaped portion when it is crimped closed with a wire received therein. A generally rectangular recess 130 is embossed in crimp connection portion 112 in alignment with weld embossment 110. The fine wire lead extends across embossed depression 130 and makes good contact with the upper and lower edges thereof when the crimp connection is crimped closed. FIG. 8 shows the crimp connection portion 112 after it has been formed into a generally U-shaped configuration for receiving a wire therein. Grooves 120-122 and embossed recess 130 are located within the interior surface of the generally U-shaped crimp portion. After a wire is inserted within the generally U-shaped portion of FIG. 8, it is crimped closed to securely lock the wire therein. The same wire is also welded to transverse embossment 110.

Figure 9:
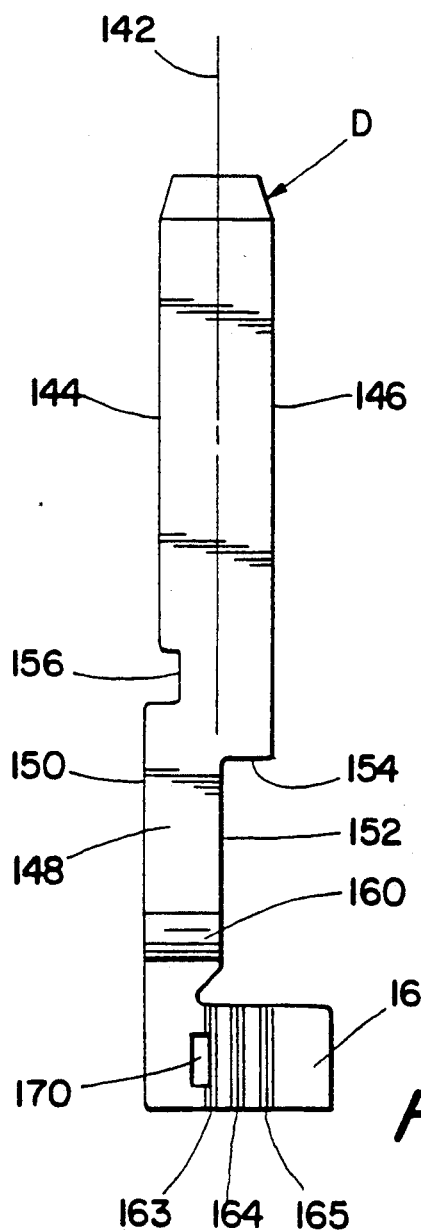
FIG. 9 is a plan view of another terminal.
Figure 10:
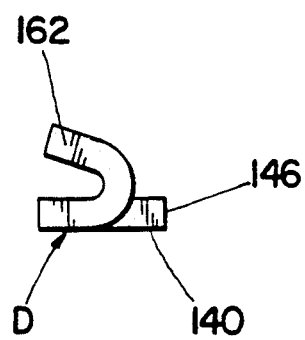
FIG. 10 is an end view showing the bottom crimp connecting portion of the terminal of FIG. 9 subsequent to forming thereof into a generally U-shaped configuration.

FIG. 9 shows terminal D having a flat blade portion 140 with a longitudinal axis 142 and opposite sides 144, 146. A narrower width tail portion 148 is laterally offset from longitudinal axis 142 so that its opposite sides 150, 152 are offset laterally from blade sides 144, 146. A shoulder and notch 154, 156 serve the same purposes as shoulder and notch 106, 107 of terminal C. A transverse weld embossment 160 is formed in tail portion 148 and a crimp connection portion 162 is provided at the lower end thereof. A plurality of spaced-apart longitudinally extending generally V-shaped grooves 163-165 are provided in crimp connection portion 162 to facilitate the bending and closing of same. A generally rectangular depression 170 is embossed in crimp connection portion 162 in alignment with weld embossment 160. FIG. 10 shows crimp connection portion 162 after it has been bent into a generally U-shaped configuration for receiving a wire lead. Grooves 163-165 and depression 170 are located within the interior surface of the generally U-shaped portion. The crimp connection portions are curved into generally U-shaped configurations such that the pocket in the U-shaped portion is on the same side of the terminal as the outwardly curved portion of weld embossment 160. The generally U-shaped pocket and the weld embossment are also longitudinally aligned.

Thermistor E and wire leads 72, 74 are preferably coated with a dielectric material that is removed from the end portions of the wire leads that are crimp and weld connected to the terminals. The wire leads are crimped and welded to the terminals of a connector and a dielectric sleeve is positioned over the connections. This assembly is then mated with a metal housing by extending the thermistor attached to the wire leads down into the tubular probe. With the parts positioned as shown in FIG. 4, deformable ring portion 40 on housing A is then deformed inwardly to lock the assembly together.

Although the invention has been shown and described with respect to a preferred embodiment, it is obvious that equivalent alterations and modification will occur to others skilled in the art upon the reading and understanding of this specification. The present invention includes all such equivalent alterations and modifications, and is limited only by the scope of the claims.

I claim:

1. A temperature sensor including a metal housing having an elongated tubular portion with a closed distal end, said metal housing having an opening opposite said distal end for providing access to the interior of said tubular portion, said tubular portion having an internal shoulder intermediate said opening and said distal end, a larger first diameter internal cylindrical surface extending from said shoulder to said opening and a smaller second diameter internal cylindrical surface extending from said shoulder to said distal end, a dielectric sleeve extending through said opening along said first diameter internal cylindrical surface and having a sleeve end abutting said shoulder, a thermistor positioned within said tubular portion adjacent said distal end, an electrical connector attached to said housing and closing said opening, said connector including a molded plastic body having a pair of electrical terminals molded therein, said electrical terminals having blade portions projecting from said body on the opposite side thereof from said metal housing and tail portions projecting from said body into said opening in said metal housing, said tail portions of said terminals including terminal end portions projecting at least partly into said dielectric sleeve, and a pair of conductors extending between said thermistor and said terminal end portions, each said conductor being connected to one of said terminal end portions.

2. The sensor of claim 1 wherein said smaller second diameter internal cylindrical surface that extends between said shoulder and said closed distal end has a length substantially greater than the length of said larger first diameter internal cylindrical surface.

3. The sensor of claim 2 wherein said opening in said metal housing has a generally inverted frusto-conical shape.

4. The sensor of claim 1 wherein the length of said smaller second diameter internal cylindrical surface is at least three times the length of said larger first diameter internal cylindrical surface.

5. The sensor of claim 1 including a sufficient amount of non-ridge heat transfer medium in said tubular portion adjacent said closed distal end thereof to completely encapsulate said thermistor while leaving the major length of the interior of said tubular portion free of said heat transfer medium.

6. The sensor of claim 1 wherein said blade portions and tail portions are laterally offset relative to one another within said plastic body to define a shoulder on each said electrical terminal within said plastic body.

7. The sensor of claim 6 wherein each said blade portion on each of said electrical terminals has a notch therein within said plastic body on the opposite side of each said blade portion from said shoulder.

8. The sensor of claim 1 wherein each said terminal end portion on said tail portions of said electrical terminals has a transverse boss therein and said conductors have conductor end portions welded to said bosses.

9. The sensor of claim 8 wherein each said terminal end portion includes a generally U-shaped crimp portion spaced from said transverse boss in a direction toward said closed distal end of said tubular portion of said housing, each said crimp portion having an internal surface with longitudinal grooves therein, and each said crimp portion being crimped closed on one of said conductor end portions.

10. The sensor of claim 9 wherein said internal surface of each said crimp portion has a depression embossed therein and each of said conductor end portions extends across said depression.

11. A temperature sensor including a thermistor positioned within a tubular probe adjacent a closed distal end thereof, said sensor including terminals for connecting said thermistor in an electrical circuit, lead wires connecting said thermistor with said terminals, and a non-ridge heat transfer medium encapsulating said thermistor, said heat transfer medium substantially filling said tubular probe adjacent said closed distal end thereof for transferring heat therethrough from the walls of said probe to said thermistor, the major length of the interior of said tubular probe between said thermistor and said terminals being void of said heat transfer medium to minimize sinking heat away from said thermistor through said probe.

12. The sensor of claim 11 including a dielectric sleeve in said tubular probe adjacent said terminals around the connections between said terminals and said lead wires, said sleeve extending over only a portion of the length of said probe adjacent said terminals such that the length of said probe occupied by said thermistor is unoccupied by said sleeve so that head transfer through said heat transfer medium from the walls of said probe to said thermistor is uninhibited by said sleeve.

* * * * *